Patented Dec. 20, 1938

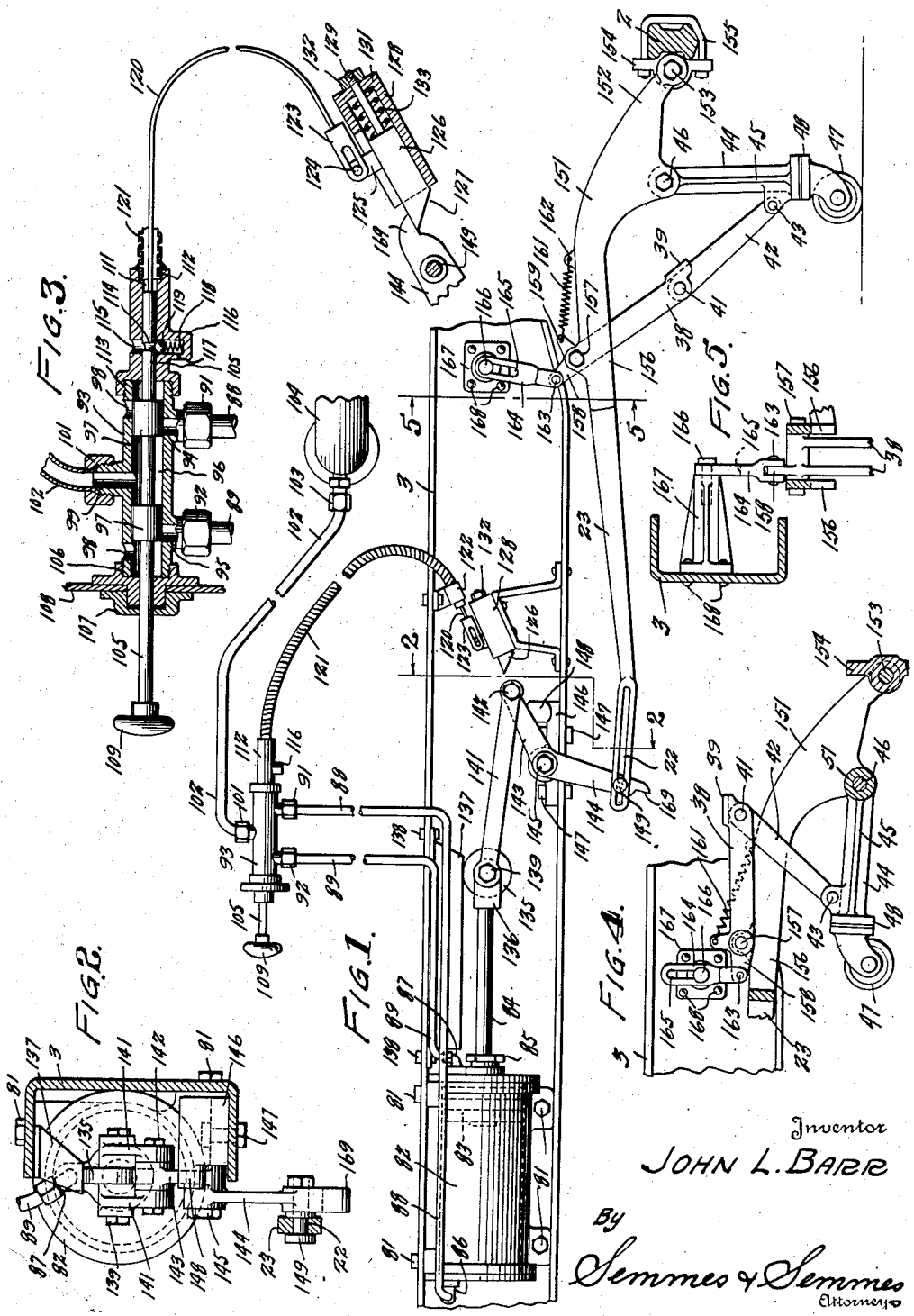

2,140,493

UNITED STATES PATENT OFFICE 2,140,493

DEVICE FOR FACILITATING MOVEMENT OF STEERING WHEELS

John L. Barr, Chevy Chase, Md.

Original application May 29, 1934, Serial No. 728,187. Divided and this application April 17, 1936, Serial No. 74,990

6 Claims. (Cl. 180—1)

This application is a division of my copending application Serial No. 728,187, filed May 29, 1934.

My invention relates to means for relieving the weight on at least one of the steering wheels of a vehicle so that the steering wheels may be more easily turned.

This application comprises means for lifting a portion of the vehicle by reason of power applied which is extraneous of the movement of the vehicle. In other forms of devices which I have invented, there has been a compression element upon which the vehicle has moved either by forward or backward movement of the vehicle. The present invention, however, contemplates the use either of manual power or mechanical power of some sort on the vehicle for accomplishing the lifting effect.

An important feature of my invention is the caster type of foot on the compression element which permits the necessary motion of the device when the wheels are in cramped position. While this device may be located in the center of the car, it is contemplated that the device will be placed nearer one of the steering wheels than the other, preferably the left front wheel, and will relieve the weight on that steering wheel. While the device is in operative position, the car will be driven back and forth in the parking or turning operations, the caster wheel relieving the weight on one of the steering wheels and making it more easy to turn them.

It is an object of this invention to have a lift device which will be in place throughout the turning operations and will permit the car to be driven back and forth without necessitating that the car be balanced on the device.

Another object of the invention is to make the operation of a steering assisting device more positive and less subject to the skill of the operator.

A still further object of the invention is to provide a strong, sturdy construction which is easy to repair and replace, and which can be readily and cheaply manufactured, and yet possesses qualities that make it strong and durable, and positive in operation.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a side elevation of my device employing motive power for operation derived from the intake manifold of the car.

Figure 2 is a view taken along the line 2—2 of Figure 1.

Figure 3 is a detail view partly in cross section of the latch and valve control mechanism for the form of invention shown in Figure 1.

Figure 4 is a detail view in side elevation showing my device in the retracted position.

Figure 5 is a view taken along the line 5—5 of Figure 1, looking in the direction of the arrows.

In the form of invention shown in these figures, I have shown attached by suitable bolts 81, or some other suitable fastening means, to the frame 3 of the car, a cylinder 82. Within the cylinder, with a fluid tight fit, is a piston 83 which is mounted on the end of a piston rod 84 which slides through a suitable packing gland 85 in the cylinder 82.

The cylinder is provided with ports 86 and 87 which communicate with pipes 88 and 89, respectively. The pipes 88 and 89 are attached, by suitable connections 91 and 92, respectively, to a valve construction 93. The valve construction 93 is provided with ports 94 and 95, and has a cylindrical central aperture 96 in which are adapted to slide two piston members 97. The valve is also provided with ports 98 and a port 99. The port 99 is attached through a suitable fitting 101 to a pipe 102. The pipe 102 is attached through a fitting 103 to the intake manifold 104 of the carburetor of a gasoline engine.

The piston leg members 97 are mounted on a control rod 105 which passes through a cylinder head 106 which is screw-threaded to the valve 93. Between the cylinder head 106 and a holding cap 107, which is screw-threaded to the cylinder head on a projection thereof, is a member indicated at 108. This may be some part of the automobile, for instance the dashboard of the car, and the construction permits of ready mounting of this control member on the dash.

The control rod 105 is provided with a handle 109. The other end of the control rod is adapted to slide in an aperture 111 provided in a cylinder head 112 which is screw-threaded at 113 to the valve body 93. The control rod 105 has a groove 114 which lies opposite an aperture 115 provided in the cylinder head member 112. Adjacent the aperture 115 the cylinder head member 112 is provided with a projection 116 which has an aperture 117 therein in which is housed a spring 118. The spring 118 presses upwardly a ball 119 which, in the position shown in Figure 3, lies within the groove 114 of the control rod 105. This ball and spring construction is adapted to hold the control rod 105 normally in the position shown in Figure 3, at which time both the port 94, which communicates with pipe 88, and the port 95, which communicates with pipe 89, are closed.

With the parts in the position shown in Figure 3, there is a suction in the pipe 102 which communicates with the intake manifold of the engine. However, because the piston head members 97 cover the ports 94 and 95, no suction is produced in the pipes 89 or 88. If the operator pushes on the handle 109 and moves the piston members 97 to the right, the port 94 will be cracked and suction will be produced in pipe 88 which will suck the piston 83 to the left with the parts in the position shown in Figure 1. A contrary movement of the handle 109 will reverse the operation of the valve construction and a suction will be produced in pipe 89 which will tend to move the piston head 83 into the position shown in dotted lines in Figure 1.

It will be noted that in their movement of the piston members 97 communication is established between one of the members 98 and the port which is not in communication with the suction through line 102. This permits atmospheric air to enter the cylinder 82 on the side of the piston 83 which is not subjected to the vacuum, thus permitting the piston 83 to move freely under the influence of the vacuum.

This statement just made is, of course, not scientifically accurate, since it is the air pressure that moves the piston 83 and the lack of the balancing pressure on the suction side which causes the piston to move under the atmospheric pressure. It is thought, however, that the operation of the piston 83 in the cylinder 82 under the control of the valve mechanism just described will be readily understood.

There is a latch release mechanism fastened to the end of the operating rod 105 which comprises a Bowden wire 120 which is fastened to the end of the operating rod 105. A Bowden wire casing 121 is fastened in the piston head extension 112. The Bowden wire casing is fastened through a bracket 122 to the flange of the frame 3.

The other end of the Bowden wire carries a lost motion linkage 123 in which is adapted to slide a pin 124 that is attached to an upright 125. The upright 125 is carried by a latch member 126 having a sloping face 127. The latch member 126 is mounted in a casing 128. The latch carries a rod 129 which passes through an aperture in the head 131 of the casing 128. There is a nut 132 mounted on the end of the rod 129 which limits the downward movement of the latch 126. A spring 133 is coiled around the rod 129 and holds the latch 126 spring pressed in the downward position as indicated in Figure 3.

By pulling the handle 109 outwardly from the dash, the latch 126 can be pulled by means of the Bowden wire 120 into the up position to release the mechanism for lifting the weight on the steering wheels. When in the position shown in Figure 3 the entire lift mechanism is held securely locked in inoperative position. It is to be noted that when the handle 109 is pulled outwardly, suction pipe 102 is placed in communication with suction pipe 89, which causes suction on the piston 83 so that piston 83 will be moved into the position shown in Figure 1. This is the position in which the lifting device is in full operaton. In other words, upon movement of the valve to bring the device into operation, the latch 126 is raised in the up position, releasing the mechanism for extension into operative position. This extension into the operative position will later be described.

On the end of the piston rod 84 is pivoted a roller 135 which is mounted between bifurcated arms 136 attached to the end of the piston rod 84. The roller 135 is adapted to travel on a level base member 137 which is adapted to take thrust forces. This member 137 may be attached by bolts 138 to the under side of the upper flange on the frame 3 of the car.

Pivoted on the axle 139 of the roller 135 is a link member 141 which is pivoted at 142 to an arm 143 of the bell crank lever which has another arm 144. The bell crank lever is pivoted on a shaft 145 which is mounted on a support base 146.

The support base 146 is bolted, by means of bolts 147, to the upper side of the lower flange of the frame 3. An upright stop member 148 is formed on the base 146 to prevent movement of the arm 143 of the bell crank lever beyond the position shown in Figure 1. The arm 144 of the bell crank lever is provided with a stud 149 that fits within the lost motion linkage 22 of the lever 23. The lever 23 in this construction is formed with a gradual bend at 151. The front end 152 of the lever is pivoted to a pivot 153 mounted in a base 154, which is supported on the front axle 2 by U-bolts 155. The lever 23 has bifurcated arms and bracing construction (not shown). The bifurcated arms I have indicated at 156 in Figure 5.

There is pivoted on the pivot bolt 157 passing through the bifurcated arms 156 of the lever 23 a construction having an arm 38 which has a stop 39, a leg 42, a pivot 41 and a pivot 43, which is located on a leg member 44.

The leg member 44 has a strenthening web 45, and is pivoted at its upper end at 46 to the lever 23. On the bottom of the leg 44 I have provided a caster construction 47, which is pivoted on a revoluble thrust bearing 48 that carries the usual caster type post, which may preferably carry a pneumatic tire.

Integrally formed with the bifurcated legs is an extension 158 and a spring support 159. Attached to the spring support 159 is a spring 161 which is attached to a spring support 162 attached to one of the bifurcated members 156 of the lever 23.

Pivoted on the extension 158 at 163 is a link member 164 having a lost motion slot 165. The lost motion slot passes over a stud 166 which is mounted on a base 167 attached by rivets or other suitable fastening members 168 to the frame 3 of the car. In operation, the device is shown in Figure 1 in the operative position, exerting a lifting force on one of the frame members 3 of the chassis. In this position of the parts the arm 144 of the bell crank lever is in the down position.

The piston head 83 is to the right with the parts shown in the position indicated in Figure 1. The lock stud 169 formed at the end of the arm 144 of the bell crank lever is not in engagement with the latch member 127, but has been released, and the forward motion, i. e., to the right in Figure 1, of the piston rod 84 has moved the bell crank lever to exert a downward movement on the end of the lever 23 through the connection of the stud 149 with the lost motion linkage 22 of the lever 23. This will relieve the weight on the steering wheel on that side of the vehicle where the device is located. The leg has been moved into the uncollapsed position, as indicated in Figure 1, through the contraction of the spring 161.

When the piston 83 is moved to the left, with the parts in the position shown in Figure 1, the extension 169 will be locked over the latch member 126, as plainly shown in Figure 3, which will hold the lever 23 in the up position. This is the "up" or inoperative position of the mechanism. The position of the parts is indicated in Figure 4. In this position the whole mechanism is latched in place, as indicated in Figure 3, and is ready to be unlatched and moved into the operative position by movement of the handle 109 on the valve mechanism 93. The operation of the valve and latch has been previously described.

With the parts shown in the position illustrated in Figure 3, the articulated collapsible compression element assumes the position illustrated in Figure 4. In this position the compression element is held in its collapsed condition without danger of its falling on to the roadway.

Upon movement of the plunger 9 through manual manipulation to the left, with the parts in the position illustrated in Figure 3 the pipe 89 is put in communication with pipe 102 which leads from the intake manifold and suction is produced at the right of the piston 83 (see Figure 1). At the same time through port 98 pipe 88 is thrown in communication with the atmosphere and pressure is produced on the left of the piston 83, which tends to move the piston 83 over into the position illustrated in Figure 1.

Member 126 has been raised so that extension 169 is no longer in contact with member 126. Therefore, the parts are permitted to proceed in their downward direction. The unlatching that occurs between members 126 and 169 takes place by reason of the movement of the Bowden wire connection 120. The first movement that occurs is for the articulated members 38 and 42 to assume the position shown in Figure 1—that is, to become straightened out. Upon further movement of the piston 83, the articulated members being straightened out, the arm 23 is pushed into position so that the vehicle is raised on the uncollapsed compression element.

While I have shown and described the preferred embodiment of my invention, I wish it to be understood that I do not confine myself to the precise details of construction herein set forth, by way of illustration, as it is apparent that many changes and variations may be made therein, by these skilled in the art, without departing from the spirit of the invention, or exceeding the scope of the appended claims.

I claim:

1. A device for relieving the weight at least in part on the steering wheels of a motor driven vehicle comprising an intake manifold, power means carried by the vehicle operated from the intake manifold, an articulated collapsible compression element carried by the vehicle, means operated by said power means to bring it to the uncollapsed state, and a lever operated by the power means to pivot it bodily downwardly after it is fully uncollapsed to relieve the weight on at least one of the steering wheels of a vehicle.

2. A device for relieving the weight at least in part on the steeling wheels of a motor driven vehicle comprising, an intake manifold, power means carried by the vehicle operated from the intake manifold, an articulated collapsible compression element carried by the vehicle, means operated by said power means to bring it to the uncollapsed state, a lever to pivot it bodily downwardly after it is fully uncollapsed to relieve the weight on at least one of the steering wheels of a vehicle, and means mounted on the compression element to compensate for movement imparted to the compression element by reason of turning of the steering wheels.

3. A device for relieving the weight at least in part on the steering wheels of a motor driven vehicle comprising, an intake manifold, power means carried by the vehicle operated from the intake manifold, an articulated collapsible compression element carried by the vehicle, means operated by said power means to bring it to the uncollapsed state, a lever to pivot it bodily downwardly after it is fully uncollapsed to relieve the weight on at least one of the steering wheels of a vehicle, and a castor attachment for the bottom of the element.

4. A device for relieving the weight at least in part on the steering wheels of a motor driven vehicle comprising, an intake manifold, an articulated collapsible compression element having an upper support pivoted on the vehicle, a lower support pivoted on the upper support, means to move the supports relative to each other to bring the element into the uncollapsed position, and power means operative from the manifold of the engine to move the compression element downwardly only after it has been straightened and reached its uncollapsed state to relieve the weight on at least one of the steering wheels of the vehicle.

5. A device for relieving the weight at least in part on the steering wheels of a motor driven vehicle comprising an intake manifold, an articulated collapsible compression element carried by the vehicle, means to bring it to the uncollapsed and fully extended state, power means carried by the vehicle to move it bodily downward only after it has reached its totally uncollapsed state, a power control mechanism, and a latch mechanism operative through movement of the power control mechanism to hold the compression element in its inoperative position.

6. A device for relieving the weight at least in part on the steering wheels of a motor driven vehicle comprising an intake manifold, a collapsible compression element carried by the vehicle, means to fully extend the collapsible compression element, power means carried by the vehicle operative from the manifold of the engine to swing the fully uncollapsed element downwardly to engage the ground, a valve controlling said power means, a latch to hold the compression element in its upper collapsed condition, and means operated by movement of a valve to release the latch.

JOHN L. BARR.